US010255778B2

(12) United States Patent
Bergman

(10) Patent No.: US 10,255,778 B2
(45) Date of Patent: Apr. 9, 2019

(54) DEACTIVATOR WITH WIRELESS COMMUNICATION ENABLER

(71) Applicant: Adam S. Bergman, Boca Raton, FL (US)

(72) Inventor: Adam S. Bergman, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 287 days.

(21) Appl. No.: 15/151,769

(22) Filed: May 11, 2016

(65) Prior Publication Data

US 2017/0069185 A1   Mar. 9, 2017

Related U.S. Application Data

(60) Provisional application No. 62/215,268, filed on Sep. 8, 2015.

(51) Int. Cl.
G08B 13/14 (2006.01)
G08B 13/24 (2006.01)
G06K 7/10 (2006.01)
G06K 19/077 (2006.01)
H04W 4/80 (2018.01)

(52) U.S. Cl.
CPC ....... G08B 13/248 (2013.01); G06K 7/10386 (2013.01); G06K 19/07758 (2013.01); G08B 13/242 (2013.01); G08B 13/2465 (2013.01); H04W 4/80 (2018.02)

(58) Field of Classification Search
CPC ................................. H04W 4/00; H04L 1/00
See application file for complete search history.

(56) References Cited

U.S. PATENT DOCUMENTS

| 6,700,489 B1 | 3/2004 | Easter et al. | |
|---|---|---|---|
| 2004/0046027 A1 | 3/2004 | Leone et al. | |
| 2011/0277022 A1* | 11/2011 | Weizman | H04L 29/12528 726/7 |
| 2014/0203936 A1* | 7/2014 | Rasband | G08B 13/2465 340/572.3 |

OTHER PUBLICATIONS

PCT International Search Report and Written Opinion of the International Searching Authority (EPO) for International Application No. PCT/US2016/050791 (dated Nov. 17, 2016).

* cited by examiner

Primary Examiner — Shirley Lu
(74) Attorney, Agent, or Firm — Fox Rothschild LLP; Robert J. Sacco; Carol E. Thorstad-Forsyth

(57) ABSTRACT

Systems (100, 150) and methods (700, 800) for transitioning a handheld device (100) from a partially inoperative state to a fully operative state. The methods comprise performing operations to pair a first communication device (150) and a second communication device (100). In response to the pairing of the first and second communication devices, the second communication device is transitioned from the partially inoperative state in which deactivation operations for deactivating an active security tag (124) are disabled to the fully operative state in which said deactivation operations are enabled.

20 Claims, 6 Drawing Sheets

DEACTIVATOR WITH WIRELESS COMMUNICATION ENABLER

CROSS-REFERENCE TO RELATED APPLICATIONS

This application claims the benefit of U.S. Provisional Patent Application 62/215,268, filed Sep. 8, 2015. The contents of this U.S. Provisional Patent Application are hereby incorporated by reference.

FIELD OF THE INVENTION

This document relates generally to handheld portable devices for detection and deactivation of Electronic Article Surveillance ("EAS") tags.

BACKGROUND OF THE INVENTION

In retail environments, EAS systems are employed. A typical EAS system in a retail setting may comprise a monitoring system and at least one security tag or label attached to an article to be protected from unauthorized removal. The monitoring system establishes a surveillance zone in which the presence of security tags and/or labels can be detected. The surveillance zone is usually established at an access point for the controlled area (e.g., adjacent to a retail store entrance and/or exit). If an article enters the surveillance zone with an active security tag and/or label, then an alarm may be triggered to indicate possible unauthorized removal thereof from the controlled area. In contrast, if an article is authorized for removal from the controlled area, then the security tag and/or label thereof can be deactivated and/or detached therefrom. The security tag and/or label is(are) detected and deactivated using a handheld device. An example of such a handheld device is described in U.S. Pat. No. 8,439,263 ("the '263 patent"). Consequently, the article can be carried through the surveillance zone without being detected by the monitoring system and/or without triggering the alarm.

SUMMARY OF THE INVENTION

The present document concerns systems and methods for transitioning a handheld device from a partially inoperative state to a fully operative state. The methods comprise performing operations to pair a first communication device and a second communication device. In response to the pairing of the first and second communication devices, the second communication device is transitioned from the partially inoperative state to the filly operative state. In the partially operative state, deactivation operations for deactivating an active security tag are disabled. In contrast, in the fully operative state, the deactivation operations are enabled.

In some scenarios, operations are performed by the second communication device to wait for a trigger event that occurs when a trigger of the second communication device is actuated by a person. The trigger is actuated to: request a detection and deactivation of the active security tag; or cause a first communication to be transmitted from the second communication device to a scanner. In the later scenario, scanning operations are performed by the scanner in response to a reception of the first communication to obtain information from an object to which the active security tag is coupled. A second communication is transmitted from the scanner to the second communication device when the information is obtained from the object. The second communication device performed operations to detect and deactivate the active security tag in response to the reception of the information sent from the scanner.

In those or other scenarios, the first communication device comprises a smart device facilitating an identification of a person in possession of the first communication device. The second communication device is a handheld tag reader. The scanner comprises a barcode scanner, a Radio Frequency Identification ("RFID") reader, or a Near Field Communication ("NFC") device.

DESCRIPTION OF THE DRAWINGS

Embodiments will be described with reference to the following drawing figures, in which like numerals represent like items throughout the figures.

DETAILED DESCRIPTION OF THE INVENTION

Figure 1:
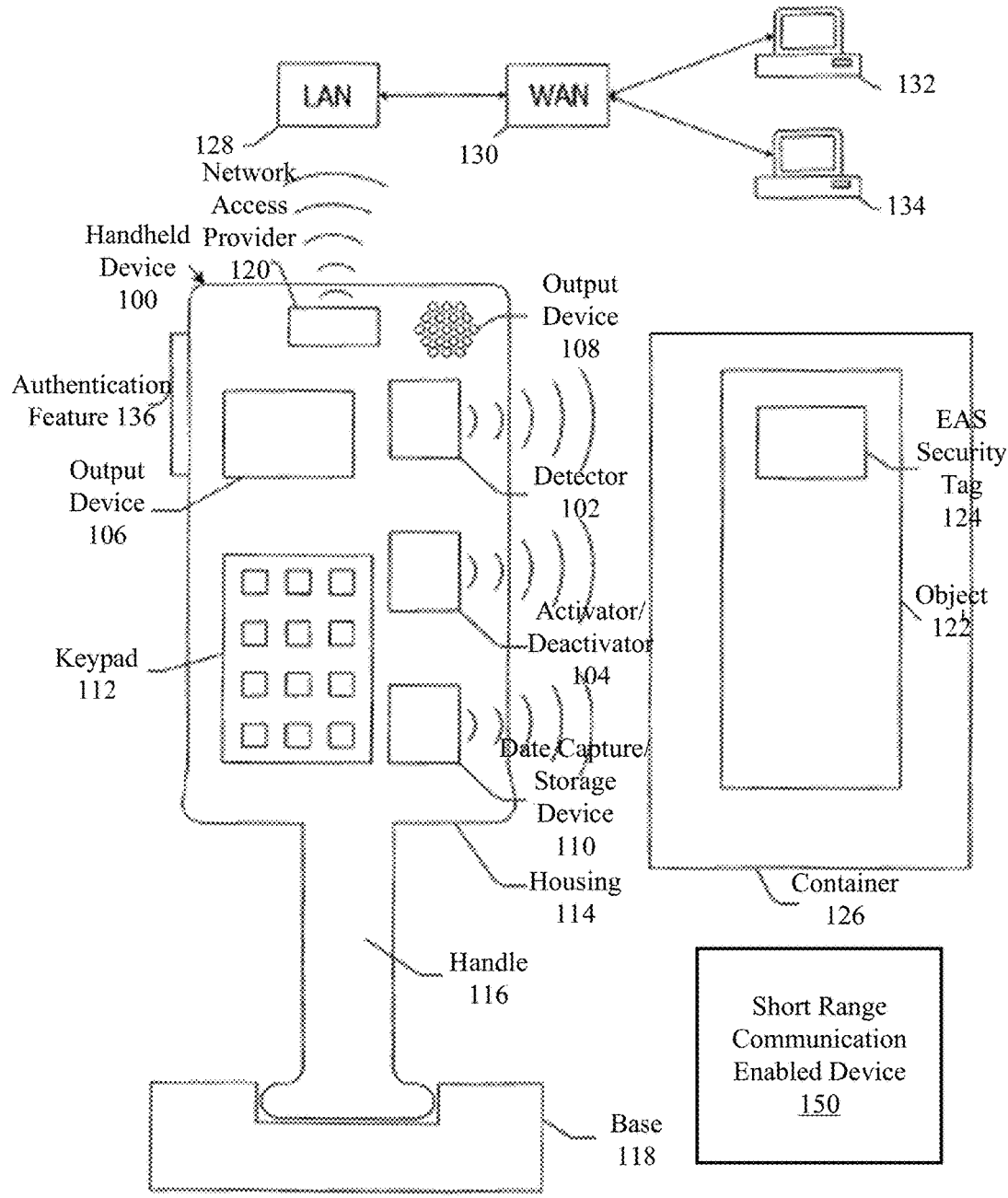
FIG. 1 is an illustration that is useful for understanding a handheld device configured to locate an active EAS security tag in a facility.
Figure 3:
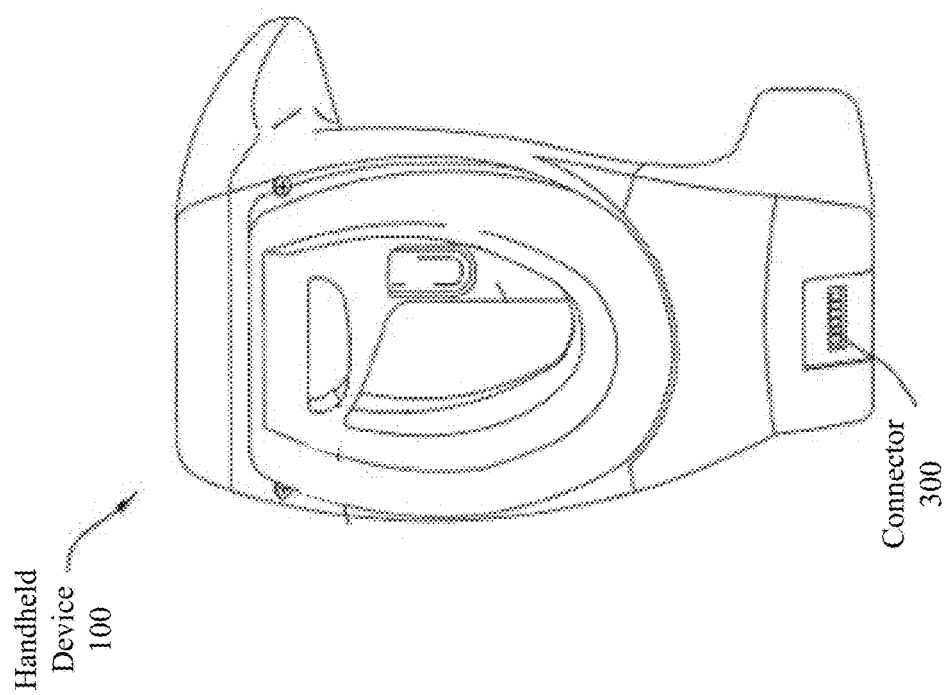
FIG. 3 is a front view of the exemplary handheld device shown in FIG. 2.
Figure 2:
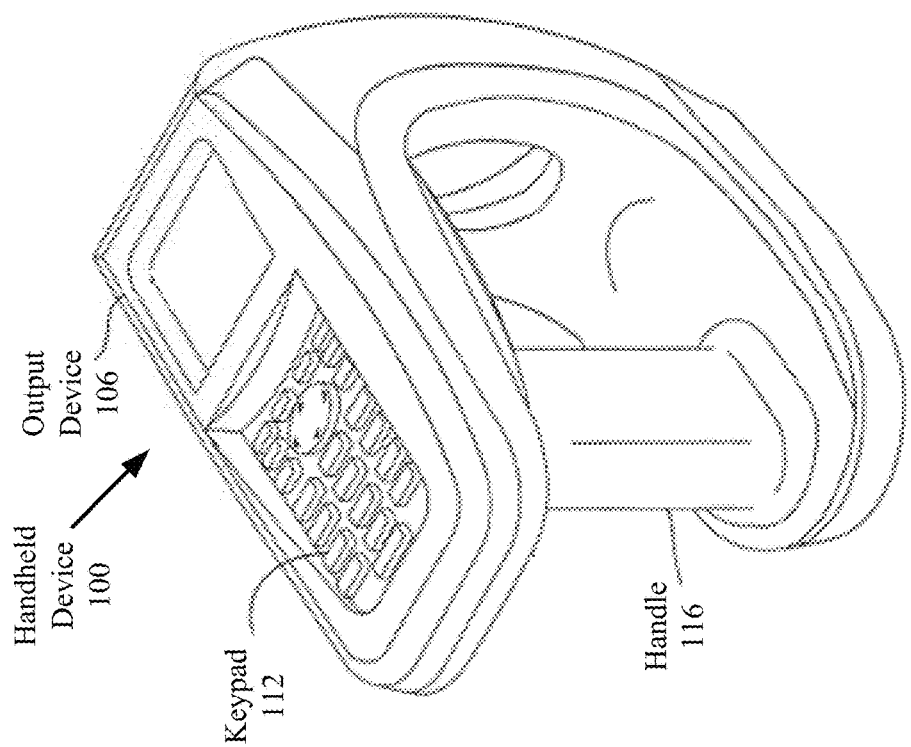
FIG. 2 is perspective view of the exemplary handheld device shown in FIG. 1.
Figure 5:
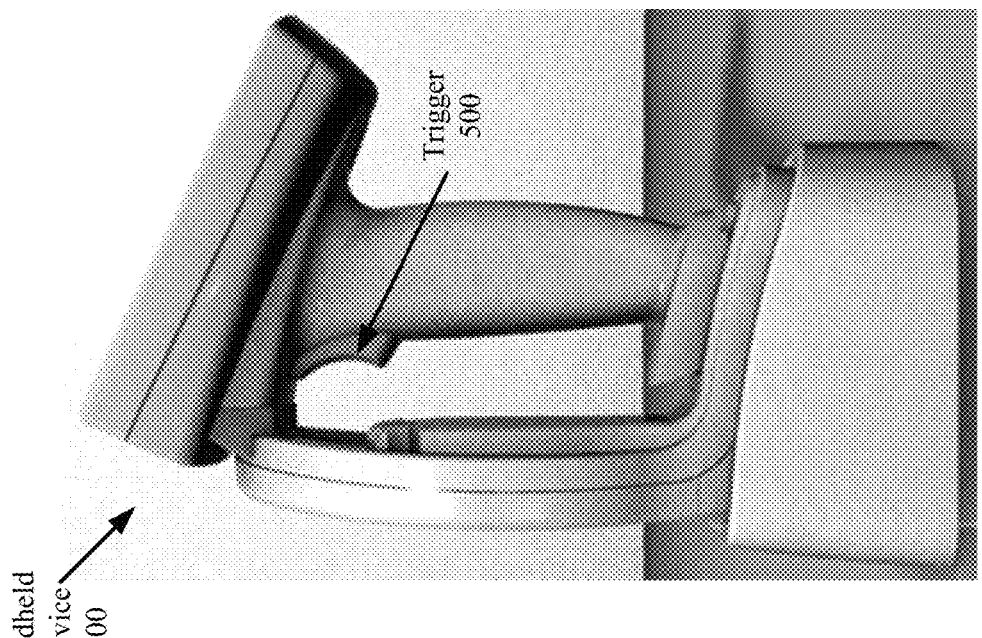
FIG. 5 is a side view of the exemplary handheld device shown in FIGS. 2-4.
Figure 4:
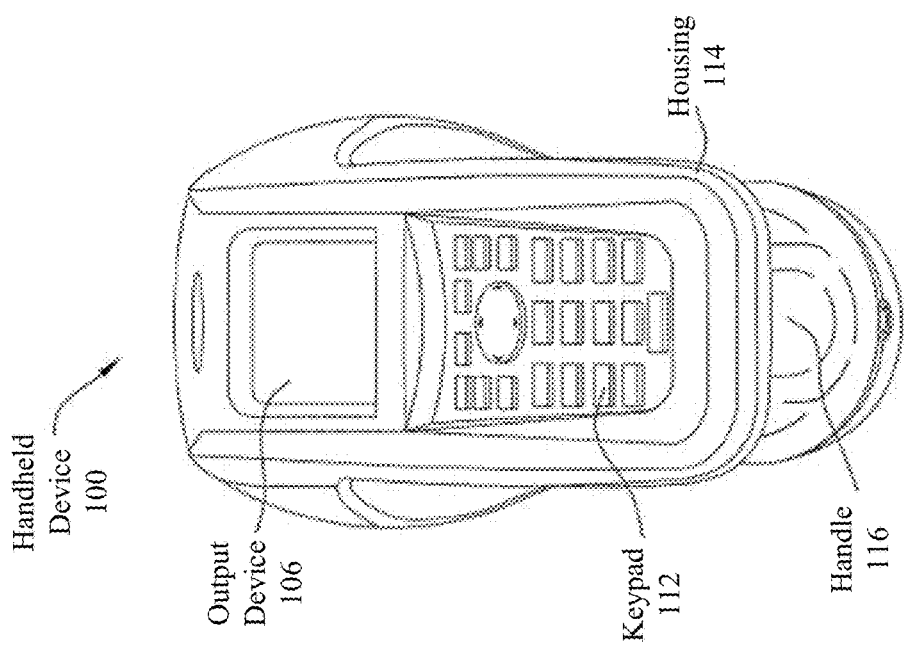
FIG. 4 is a top view of the exemplary handheld device shown in FIGS. 2-3.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Some conventional handheld devices are able to detect and deactivate security tags and/or labels (e.g., EAS security tags). However, such handheld devices are only functional when mated to a scanner of a specific type, which is provided by a first company other than the second company which supplies the handheld device. As such, any potential customer of the second company needs to interface with the handheld device technology and the scanner technology. This is a cumbersome and costly process for the potential customer.

The handheld device's detection and deactivation operations are triggered by the attachment of the scanner thereto so that unauthorized use thereof for theft is unlikely. Special firmware is implemented by the handheld device to trigger the handheld device's detection and deactivation. In order to expand the handheld device's functionality beyond the scanners, a novel handle has been designed for the handheld device. The handle generally comprises a trigger and a wireless communication module. The wireless communication module is provided to maintain the security of the handheld device and to facilitate the enablement of the handheld device's detection and deactivation operations. In some scenarios, the wireless communication module is a Bluetooth® based communication module. Communication protocols other than Bluetooth® can be used herein without limitation. Also, it should be appreciated that the wireless communication module may be disposed in a portion other than the handle of the handheld device in accordance with a particular application. Still, the handle based configuration is discussed herein for ease of explanation.

The novel handle is described herein in relation to handheld detectors/deactivators for security tags. The present invention is not limited in this regard. The novel handle can also be used with other mobile devices, such as iOS or android devices. These other mobile devices may implement tag deactivation software. In some scenarios, the handheld/mobile devices and corresponding controlling devices communicate indirectly through a WiFi network via a wireless router.

Referring now to FIGS. 1-5, there are provided illustrations that are useful for understanding an exemplary handheld device 100. Handheld device 100 is generally configured to detect the presence of an active EAS security tag 124, as well as deactivate the EAS security tag at certain select times. The EAS security tag 124 is coupled to an object 122 to be protected. For example, in a retail store, the EAS security tag is attached to a retail item so as to prevent theft thereof by causing an alarm to be issued when the object travels into a surveillance zone located near an exit of the retail store. If the retail item is successfully purchased, then the EAS security tag is deactivated such that the object can be removed from the retail store without alarm issuance.

As shown in FIG. 1, the handheld device 100 comprises a housing 114 with a handle 116. Various electronic components are disposed in the housing. The electronic components include a detector 102 and an activator/deactivator 104. The detector 102 detects the presence of active EAS security tags 124 located in proximity thereto. Such a detector 102 is useful in retail settings. For example, when an alarm issues, an employee approaches the person in possession of the active EAS security tag which is located in the surveillance zone. The detector 102 allows the employee to quickly identify which EAS security tag of a plurality of EAS security tags is active. The deactivator 104 allows the employee to deactivate the active EAS security tag so that the person can exit the retail store without another alarm issuance.

In some scenarios, the detector 102 may be a Radio Frequency Identifier ("RFID") label detector for detecting the active EAS device in the form of an RFID label within a working range of the detector 102. The detector 102 can also be an acoustomagnetic or electromagnetic tag detector. With the detector 102, the active EAS device can be readily detected in a group of items, through a container 126 (e.g., a gift box or shopping bag) or through clothing (e.g., a coat). Techniques for detecting active EAS devices are well known in the art. Any known or to be known technique can be used herein without limitation.

In those or other scenarios, the handheld device 100 comprises at least one output device 106, 108 for outputting a detection indicator. The detection indicator includes, but is not limited to, a visual indicator, an auditory indicator and/or a vibrational indicator. As such, the output device 106 comprises a display screen and/or light emitting diode. The output device 108 comprises a speaker.

As noted above, the handheld device 100 comprises an activator/deactivator 104. The activator/deactivator 104 is generally configured to change the state of the EAS security tag 122 from an active state to an inactive state, and vice versa. Such a state changing function facilitates: the activation of an inactive EAS security tag when coupled to an object to be protected; the deactivation of an active EAS security tag coupled to an object which has been successfully purchased or otherwise no longer needs to be protected; and/or the reuse of a reusable EAS security tag. Techniques for activating and deactivating EAS security devices are well known in the art. Any known or to be known technique for activating and deactivating an EAS security device can be employed herein without limitation.

Referring again to FIG. 1, the handheld device 100 also comprises a Data Capture and Storage ("DCS") device 110 for capturing and storing data related to detected, activated and/or deactivated EAS security tags. In this regard, the DCS device 110 may include, but is not limited to, a manual data entry device (e.g., a device including a processor, a keypad 112, a touch screen, a joystick and/or a stylus), a barcode scanner, and/or an RFID reader. In all cases, the DCS device 110 captures at least one of: times at which EAS security tags are detected; unique identifiers of detected EAS security tags; zones within a facility in which EAS security tags are detected; unique identifiers of objects to which detected EAS security tags are coupled; reasons for the active states of the EAS security tags; and/or information associated with Point-Of-Sale ("POS") transactions associated with the objects. The DCS device 110 may capture and store information other than that listed above.

Notably, the handheld device 100 includes a rechargeable battery (not shown). Accordingly, a base 118 is provided for facilitating the recharging of the rechargeable battery and/or storing the handheld device 100 when not in use. The base 118 may also act as a connection point between the handheld device 100 and a network, such as for data downloading from the handheld device 100 to a remote device (e.g., a remote server). In this regard, the handheld device 100 comprises a connector 300 which mates to corresponding connection (not shown) of the base 118.

The handheld device 100 further comprises a Network Access Provider ("NAP") 120. NAP 120 facilitates communication between the handheld device 100 and a network 128 for sending data to the network and receiving data from the network. Network 128 can include, but is not limited to, a Local Area Network ("LAN"). Network 128 may be further connected to another network 130. Network 130 includes, but is not limited to, a Wide Area Network 130 ("WAN"). Network 130 may be used to communicate data to a client computer 132, 134 remote from the handheld device 100.

In the example depicted in FIG. 1, NAP 120 is a wireless NAP. With NAP 120, the data captured by DCS device 110 may be transferred wirelessly in accordance with a wireless technology. The wireless technology includes, but not limited to, WiFi, Bluetooth, Global System for Mobile communications ("GSM") and/or General Packet Radio Service ("GPRS"). With NAP 120, the handheld device 100 may connect directly with a retailer's in-store, wired or wireless network for real-time communication and decision making. In the retailing example, the wireless networking allows the handheld device 100 to be used virtually anywhere in the retail store to speed up alarm handling at exits, move customers more quickly during purchasing, replace inefficient and inaccurate paper logging, and provide data for evaluating and improving retail operations.

Notably, an authentication feature 136 is provided with the handheld device 100. The authentication feature 136 ensures that only authorized personal can use the handheld device 100. In this regard, the authentication feature 136 comprises a Short Range Communication ("SRC") device. The SRC device can include, but is not limited to, a Bluetooth device. The SRC device 136 communicates with another SRC enabled device 150 disposed on or coupled to a person (not shown) authorized to use the handheld device 100. The communication between the two SRC enabled devices 136, 150 involve: obtaining a unique identifier associated with the person; comparing the unique identifier to a plurality of pre-stored unique identifiers; and pairing the two SRC enabled devices when a unique identifier match is found. Techniques for pairing two SRC enabled devices are well known in the art. Any known or to be known pairing technique can be used herein without limitation.

For example, in a retail environment, the authentication feature 136 is employed at the beginning of an employee's shift. The employee possesses a Bluetooth device (e.g., SRC device 150 of FIG. 1) with a unique identifier stored thereon that is useful for identifying the employee. Once the Bluetooth device is in range of the handheld device 100, a device pairing process begins. The pairing process initiates a communication session between the Bluetooth device and the authentication feature 136 of the handheld device 100. As a result of the device pairing, the handheld device 100 changes states from an inoperable state to an operable state. When the handheld device 100 enters its operable state, it waits for a trigger event. The trigger event can occur when a trigger 500 is depressed. If the Bluetooth device travels out of range of the authentication feature 136, then the handheld device 100 transitions back to its inoperable state.

Figure 6:
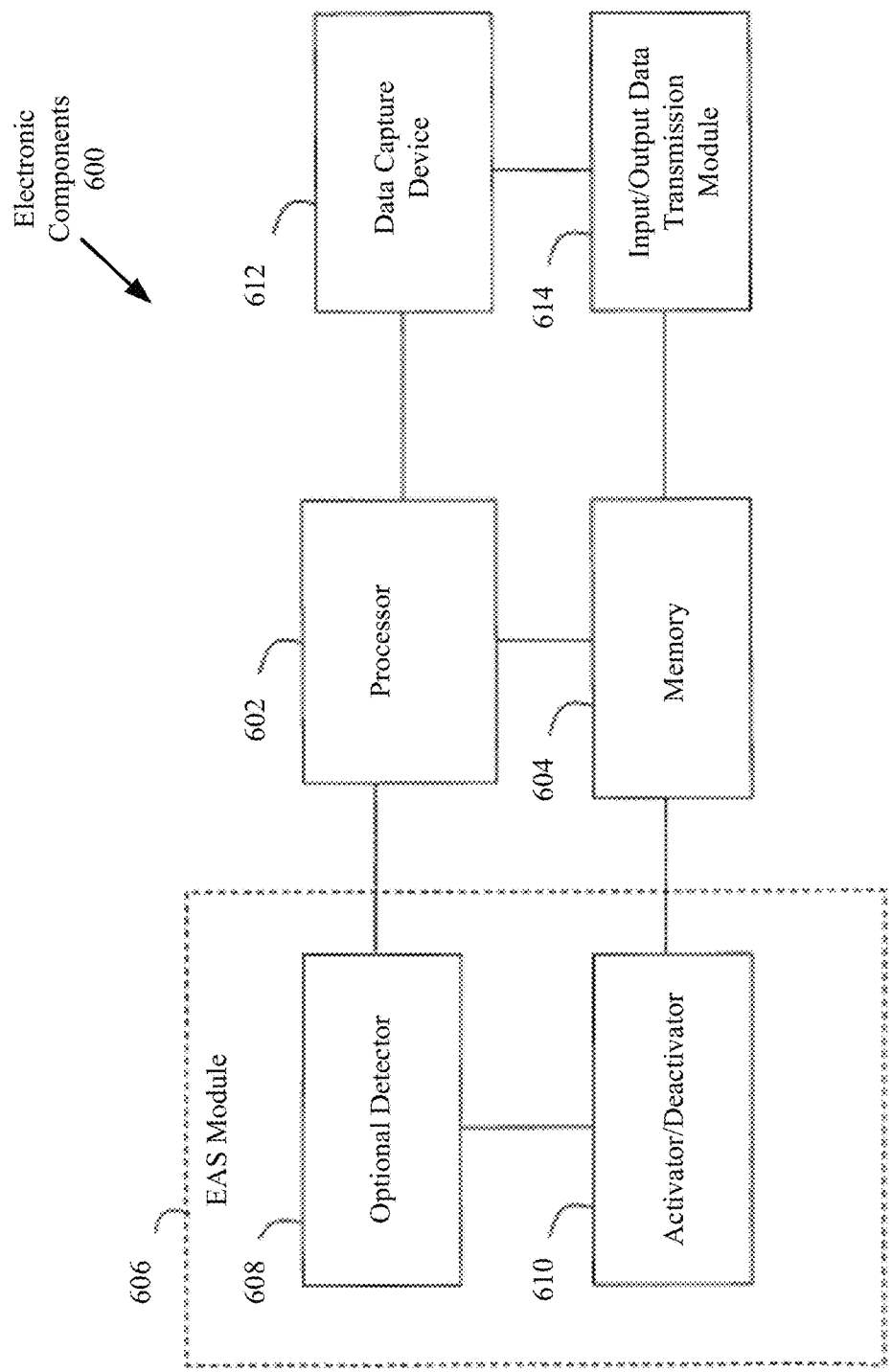
FIG. 6 is a block diagram of exemplary electronic components disposed within the exemplary handheld device shown in FIGS. 2-5.

Referring now to FIG. 6, there is provided a block diagram of exemplary electronic components 600 disposed within a handheld device, such as the exemplary handheld device 100 shown in FIGS. 2-5. The electronic components 600 comprise a processor 602, a memory 604, an EAS module 606, a data capture device 612 and at least one Input/Output ("I/O") data transmission module 614. The processor 602 can have an embedded operating system (e.g., a Microsoft Windows Embedded CE operating system).

The EAS module 606 includes a detector 608 and an activator/deactivator 610. The detector 608 detects the presence of an active EAS device in proximity thereto. The detector 608 can include, but is not limited to, a transmitter for transmitting an interrogation signal and a receiver for receiving signals that are useful to detect alarm patterns. The activator/deactivator 610 is operable to change the state of an EAS security device. For example, the activator/deactivator 610 can cause an EAS security tag to transition from an inactive state to an active state, and/or from an active state to an inactive state. The activator/deactivator 610 can include, but is not limited to, a contact deactivator and/or a proximity deactivator.

The data capture device 612 collects data relevant to an alarm event triggered by an EAS device. The collected data may be stored in local memory 604 or external memory (not shown) to provide an electronic alarm event log. At least one I/O data transmission module 614 is provided to facilitate the transfer of logged alarm event data and/or other data to a remote device (e.g., a central server). The data transmission can be effected by direct electronic coupling of the I/O data transmission module 614 to the remote device using any suitable conventional communication link. The communication link can include, but is not limited to, a telephone line, an Institute of Electrical and Electronics Engineers ("IEEE") based connection, an Ethernet based connection, a Universal Serial Bus ("USB") based connection, an Infrared Data Association ("IrDA") based connection, and/or a fiber optic based connection.

Figure 7:
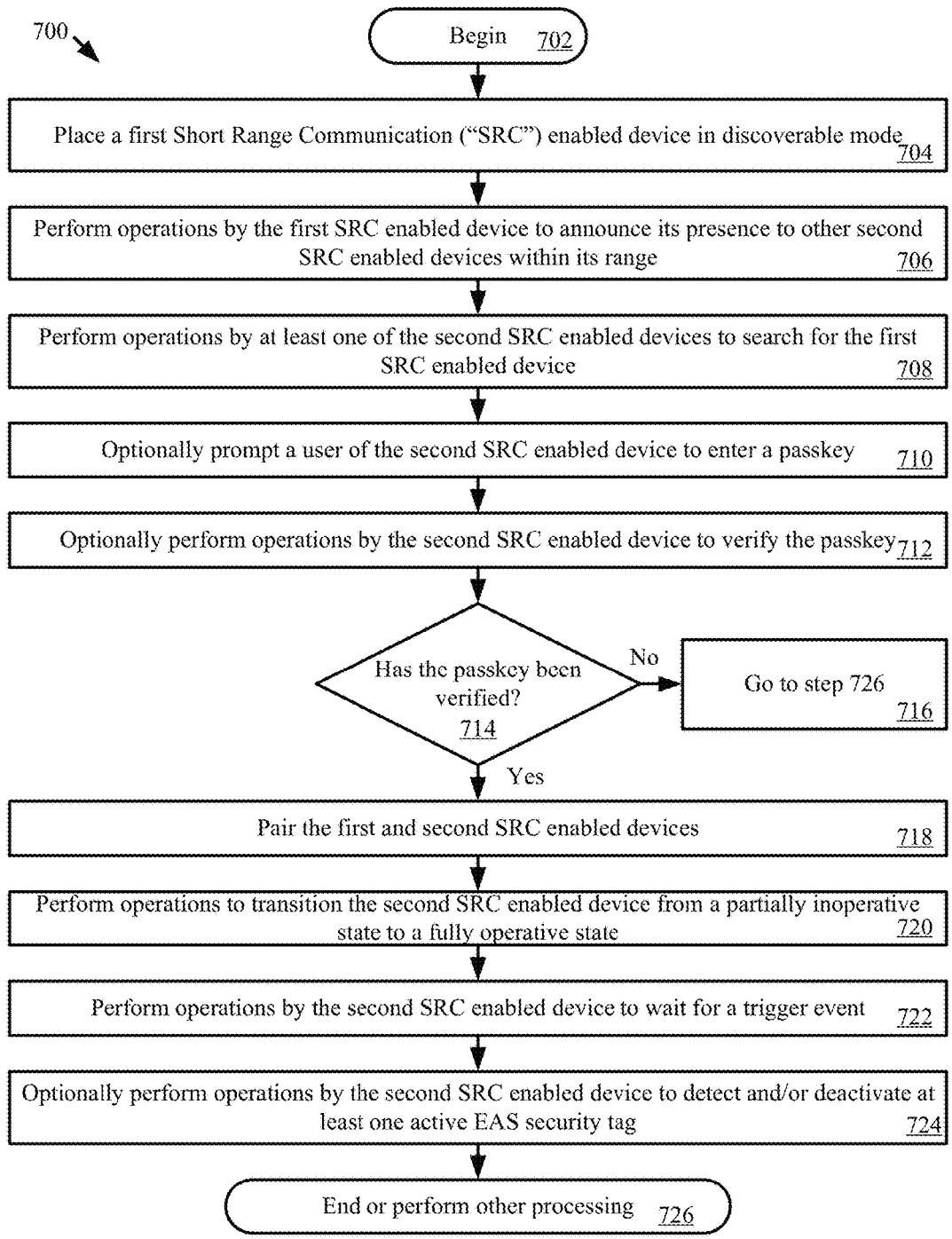
FIG. 7 is a flow diagram of an exemplary method for transitioning a handheld device from a partially inoperative state to a fully operative state.

Referring now to FIG. 7, there is provided a flow diagram of an exemplary method 700 for transitioning a handheld device (e.g., handheld device 100 of FIGS. 1-5) from a partially inoperative state to a fully operative state. Method 700 begins with step 702 and continues with step 704 where a first SRC enabled device (e.g., a SRC enabled device 150 of FIG. 1) is set to discoverable mode. In some scenarios, the first SRC enabled device includes an SRC enabled device in the possession of a person (e.g., an employee). In discoverable mode, the first SRC enabled device announces its presence to other second SRC enabled devices within its range, as shown by step 706. At least one second SRC enabled device (e.g., the handheld device 100 of FIG. 1) searches for the first SRC enabled device in step 708. When the second SRC enabled device finds the first SRC enabled device, the user of the second SRC enabled device (e.g., the handheld device) is optionally prompted to enter a passkey in step 710. The passkey can include, but is not limited to, an N digit number where N is an integer (e.g., 4). Thereafter, step 712 is performed where the second SRC enabled device (e.g., the handheld device) optionally performs operations to verify the passkey. If the passkey is not verified [714:N0], then step 716 is performed where method 700 continues to step 726. In step 726, method 700 ends or other processing is performed.

If the passkey has been verified [714:YES], then the first and second SRC enabled devices are paired. Once the two devices are paired, operations are performed to transition the second SRC enabled device from a partially inoperative state to a fully operative state, as shown by step 720. In the fully operative state, the second SRC enabled device waits for a trigger event in step 722. In some scenarios, the trigger event occurs when a trigger (e.g., trigger 500 of FIG. 1) of the second SRC enabled device is depressed. The trigger may be triggered to request the detection and/or deactivation of active EAS security tags (e.g., EAS security tag 122 of FIG. 1) that are located in proximity to the second SRC enabled device, as shown by optional step 724. The detection and/or deactivation operations are disabled when the second SRC enabled device is in its partially inoperative state. Upon completing optional step 724, step 726 is performed where method 700 ends or other processing is performed.

Notably, the present invention is not limited to the paring process described above. For example, in other scenarios, the first SRC enabled device sends a request to pair with the second SRC enabled device. In response to the request, the first and/or second SRC enabled device prompts a user to enter a passkey. Thereafter, the first and/or second SRC enabled device verifies the passkey. When the passkey is verified by the first and/or second SRC enabled device the user is provided access to the second SRC enabled device (i.e., the second SRC enabled device is placed in a fully operative mode).

Figure 8:
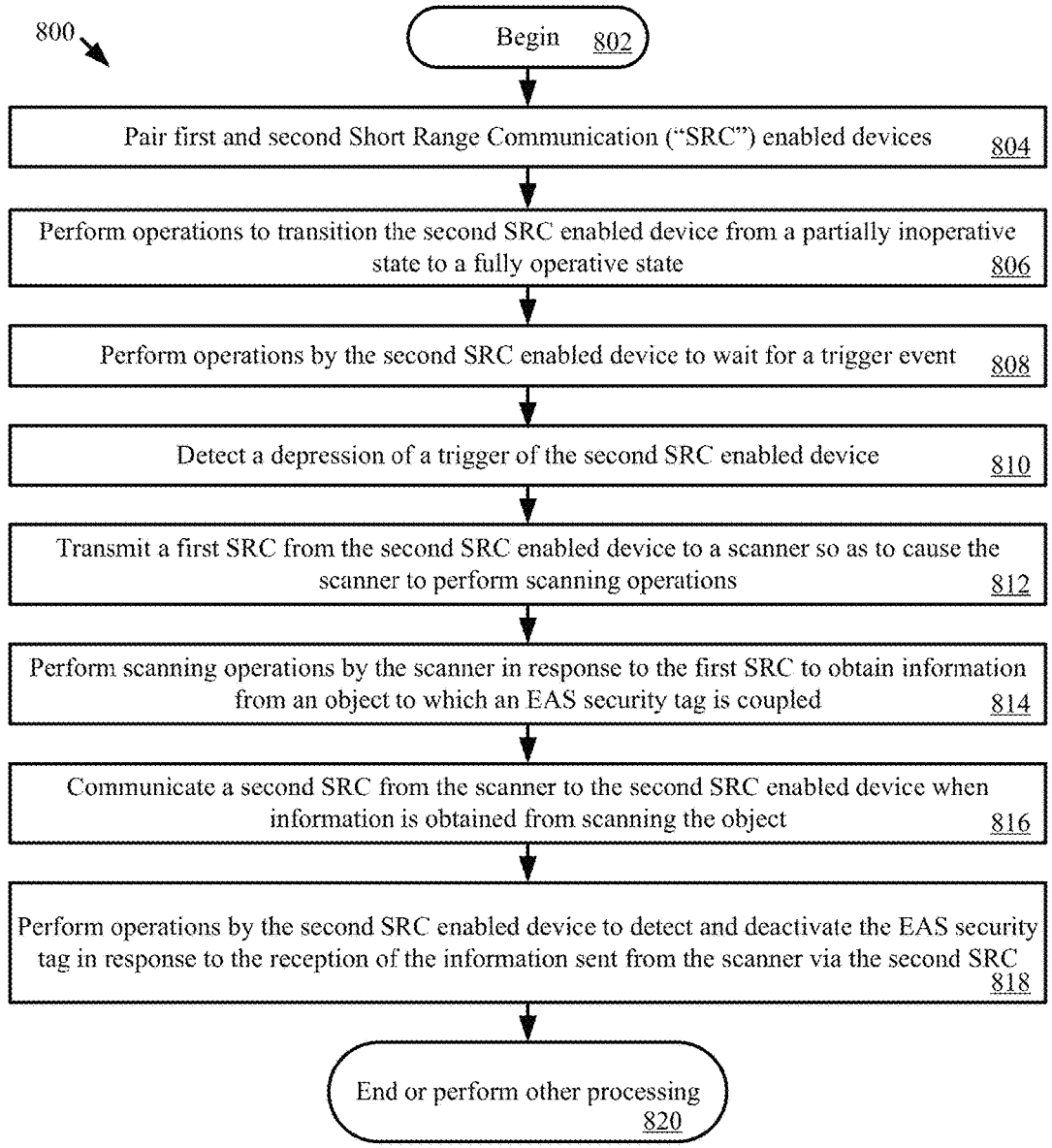
FIG. 8 is a flow diagram of an exemplary method for deactivating an EAS security tag.

Referring now to FIG. 8, there is provided a flow diagram of an exemplary method 800 for deactivating an EAS security tag (e.g., EAS security tag 124 of FIG. 1). Method 800 begins with step 802 and continues with step 804 where first and second SRC enabled devices are paired. The first SRC enabled device (e.g., SRC enabled device 150 of FIG. 1) comprises a device in the possession of a person, such as an employee. In some scenarios, the first SRC enabled device includes, but is not limited to, a mobile phone, a wrist band and/or a smart card. The second SRC enabled device includes a handheld device (e.g., handheld device 100 of FIG. 1) that is configured to deactivate EAS security tags.

Once the first and second SRC enabled devices have been paired, step 806 is performed where the second SRC enabled device changes its state from a partially inoperative state to a fully operative state. In the fully operative state, the second SRC enabled device waits for a trigger event, as shown by step 808. In step 810, a trigger (e.g., trigger 500 of FIG. 1) of the second SRC enabled device is actuated (e.g., depressed, rolled, slid, etc.). As a result, a first SRC (e.g., a Bluetooth signal) is transmitted in step 812 from the second SRC enabled device to a scanner so as to cause the scanner to perform scanning operations. The scanner includes, but is not limited to, a barcode scanner, an RFID reader, and/or a Near Field Communication ("NFC") device. The scanner can be local to the second SRC enabled device or remote from the second SRC enabled device. In response to the reception of the first SRC, the scanner performs scanning operations in step 814 to obtain information from an object to which an EAS security tag is coupled. A second SRC is communicated in step 816 from the scanner to the second SRC enabled device when information is obtained from scanning the object. The second SRC may include the information obtained from the object (e.g., a unique identifier for the object) and/or other information. In response to the reception of the second SRC, the second SRC enabled device performs operations in step 818 to detect and deactivate the EAS security tag coupled to the object. Thereafter, method 800 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for operating a handheld device, comprising:
obtaining a unique identifier from a first communication device;
comparing the unique identifier to a plurality of pre-stored unique identifiers identifying authorized users of a second communication device;
performing operations to pair the first communication device and the second communication device when results of the comparing indicate that the unique identifier matches one of the pre-stored unique identifier;
in response to the pairing of the first and second communication devices, transitioning the second communication device from a partially inoperative state in which deactivation operations for deactivating an active Electronic Article Surveillance ("EAS") security tag are disabled to a fully operative state in which said deactivation operations are enabled; and
transitioning the second communication device back to the partially inoperative state when the first communication device travels out of range of the second communication device.

2. The method according to claim 1, further comprising performing operations by the second communication device to wait for a trigger event that occurs when a trigger of the second communication device is actuated by a person.

3. The method according to claim 2, wherein the trigger is actuated to request a detection and deactivation of the active EAS security tag.

4. The method according to claim 2, wherein the trigger is actuated to cause a first communication to be transmitted from the second communication device to a scanner.

5. The method according to claim 4, further comprising performing scanning operations by the scanner in response to a reception of the first communication to obtain information from an object to which the active security tag is coupled.

6. The method according to claim 5, further comprising transmitting a second communication from the scanner to the second communication device when the information is obtained from the object.

7. The method according to claim 6, further comprising performing operations by the second communication device to detect and deactivate the active security tag in response to the reception of the information sent from the scanner.

8. The method according to claim 1, wherein the first communication device comprises a smart device facilitating an identification of a person in possession of the first communication device.

9. The method according to claim 1, wherein the second communication device is a handheld tag reader.

10. The method according to claim 4, wherein the scanner comprises a barcode scanner, a Radio Frequency Identification ("RFID") reader, or a Near Field Communication ("NFC") device.

11. A system, comprising:
a first communication device configured to be paired to with a second communication device, where a paring between the first and second communication devices is performed when results of comparison operations indicate that a unique identifier obtained from the first communication device matches one of a plurality of pre-stored unique identifiers identifying authorized users of the second communication device; and
the second communication device that transitions from a partially inoperative state in which deactivation operations for deactivating an active Electronic Article Surveillance ("EAS") security tag are disabled to a fully operative state in which said deactivation operations are enabled, in response to the pairing of the first and second communication devices;
wherein the second communication device transitions back to the partially inoperative state when the first communication device travels out of range of the second communication device.

12. The system according to claim 11, wherein the second communication device further performs operations to wait for a trigger event that occurs when a trigger of the second communication device is actuated by a person.

13. The system according to claim 12, wherein the trigger is actuated to request a detection and deactivation of the active EAS security tag.

14. The system according to claim 12, wherein the trigger is actuated to cause a first communication to be transmitted from the second communication device to a scanner.

15. The system according to claim 14, wherein the scanner performs scanning operations in response to a reception of the first communication to obtain information from an object to which the active EAS security tag is coupled.

16. The system according to claim 15, wherein a second communication is transmitted from the scanner to the second communication device when the information is obtained from the object.

17. The system according to claim 16, wherein the second communication device performs operations to detect and deactivate the active security tag in response to the reception of the information sent from the scanner.

18. The system according to claim 11, wherein the first communication device comprises a smart device facilitating an identification of a person in possession of the first communication device.

19. The system according to claim 11, wherein the second communication device is a handheld tag reader.

20. The system according to claim 14, wherein the scanner comprises a barcode scanner, a Radio Frequency Identification ("RFID") reader, or a Near Field Communication ("NFC") device.

* * * * *